United States Patent [19]

Hall

[11] Patent Number: 5,730,921
[45] Date of Patent: Mar. 24, 1998

[54] CO-MOLDING PROCESS FOR PRODUCING REFRACTORY MATERIALS WITHOUT FIRING OR COKING THE REFRACTORY

[75] Inventor: Richard G. Hall, Hiram, Ohio

[73] Assignee: North American Refractories Company, Cleveland, Ohio

[21] Appl. No.: 414,421

[22] Filed: Mar. 31, 1995

[51] Int. Cl.$^6$ .................................................. B29C 71/00
[52] U.S. Cl. ........................... 264/234; 264/236; 264/266; 264/319; 264/320
[58] Field of Search .............................. 264/234, 236, 264/319, 266, 320

[56] References Cited

U.S. PATENT DOCUMENTS

| | | | |
|---|---|---|---|
| 3,956,452 | 5/1976 | Saito | 264/89 |
| 4,045,935 | 9/1977 | Morris | 52/599 |
| 4,113,817 | 9/1978 | Kröger et al. | 264/120 |
| 4,155,064 | 5/1979 | Brandt et al. | 338/308 |
| 4,164,067 | 8/1979 | Brandt et al. | 29/620 |
| 4,213,113 | 7/1980 | Brandt et al. | 338/309 |
| 4,261,154 | 4/1981 | Mazur | 52/599 |
| 4,569,921 | 2/1986 | Omori et al. | 501/88 |
| 4,994,219 | 2/1991 | Yeh | 264/62 |
| 5,019,537 | 5/1991 | Kato et al. | 501/1 |
| 5,075,053 | 12/1991 | Bernadie et al. | 264/56 |
| 5,085,806 | 2/1992 | Yasutomi et al. | 252/518 |
| 5,098,870 | 3/1992 | Claar et al. | 501/87 |
| 5,167,887 | 12/1992 | Su | 264/63 |
| 5,200,373 | 4/1993 | Yasuiomi et al. | 501/97 |
| 5,244,623 | 9/1993 | King | 264/510 |
| 5,264,168 | 11/1993 | Toncelli | 264/63 |
| 5,271,871 | 12/1993 | Yasutomi et al. | 252/518 |

Primary Examiner—Timothy Speer
Attorney, Agent, or Firm—Benesch, Friedlander, Coplan & Aronoff

[57] ABSTRACT

The present invention is directed to a co-molding process for producing co-molded, chemical bonded, canned refractory articles which eliminates the costly and problematic firing or sintering steps and which eliminates the time consuming separate canning and sizing of the refractory articles as required by conventional methods. The co-molding process of the present invention comprises the steps of:

(a) mixing a refractory aggregate with a chemical binder to form a pressable refractory composition;

(b) placing a metal can into a press cavity die;

(c) charging said refractory composition into said metal can and press cavity die;

(d) subjecting said refractory composition to high pressures while in said press cavity die to shape and size said refractory article; and (e) drying said refractory article at temperatures sufficient to cure said chemical binder.

27 Claims, 2 Drawing Sheets

5,730,921

CO-MOLDING PROCESS FOR PRODUCING REFRACTORY MATERIALS WITHOUT FIRING OR COKING THE REFRACTORY

FIELD OF INVENTION

The present invention relates to a co-molding process for producing co-molded, chemical-bonded, canned refractory articles. In particular, a refractory composition containing a refractory aggregate and a chemical binder, is co-molded under relatively high pressures to form the article followed by drying at temperatures sufficient to cure the chemical binder but not at temperatures high enough to be detrimental to the metal can. More particularly, the present invention relates to a process for producing co-molded, canned refractory nozzles and co-molded, canned refractory slide gate plates.

BACKGROUND OF THE INVENTION

Processes for manufacturing canned refractory articles are well known in the prior art. One of prior art methods for producing canned refractory articles comprises mixing a refractory aggregate with a chemical binder or wetting agent to form a refractory composition of pressing consistency. The composition is pressed to shape the article. The article is sized, dried, and then fired to form ceramic bonds. The article is assembled in a can typically by using mortar in the joint between the can and the article and positioned in the can to achieve the correct final dimensions of the article. The canned article may then be dried again. This process of forming a canned refractory article is very expensive as it requires high temperature firing to form the ceramic bonds and a separate canning process.

Another method for forming canned refractory articles comprises mixing a refractory aggregate with a chemical binder to form a refractory composition of pressing consistency. The composition is pressed to shape the article. The article is sized and then dried or cured to form chemical bonds. The article is assembled in a can typically by using mortar in the joint between the can and the article and positioned in the can to achieve the correct final dimensions of the article. The canned article is then dried again. This process eliminates the high temperature firing step of the process described above but still requires a separate canning process.

A further method for forming canned refractory articles comprising mixing a refractory aggregate to form a refractory castable. The composition is cast into a can and mold assembly to form the shape of the article and the article is sized. The article stays in the mold at ambient temperature until the castable sets. The canned article is then removed from the mold and dried at a higher temperature. This process eliminates the high temperature firing and canning steps but the range of compositions which can be used to form the articles is limited. Further, the production rates are limited by the number of molds and set time of the castable.

Another method for producing canned refractory articles comprises mixing a refractory aggregate with a chemical binder to form a refractory composition of ramming consistency. A can is placed in a mold assembly. The refractory composition is rammed into the can and mold to form the shape of the article and the article is sized. The canned article is then dried or cured to form the chemical bonds. This process in which the refractory composition is rammed into the can and molded to form the article takes a lot of time. Further, the ramming of the composition into the can and mold to form the article is not able to be done at relatively high pressures.

One of the problems with the conventional methods of producing canned refractory articles is that the firing or sintering steps required by some of the processes of the prior art require large amounts of energy and is very expensive. Those methods which do not require high temperature firing are often undesirable due to limitations in material selection or forming processes. Further, the separate canning and sizing steps of the conventional methods are costly and time consuming.

It is desirable to have a process for producing canned refractory articles which eliminates the costly and problematic firing or sintering step. It is also desirable to have a process for producing refractory articles which eliminates the time consuming separate canning and sizing steps of the refractory articles as required by the conventional methods of the prior art.

SUMMARY OF THE INVENTION

In accordance with the present invention there is provided a co-molding process for producing co-molded, chemical bonded, canned refractory articles which eliminates the costly and problematic firing or sintering steps of the conventional methods.

Further in accordance with the present invention, there is provided a co-molding process for producing co-molded, chemical-bonded, canned refractory articles which eliminates the time consuming separate canning and sizing of the refractory articles as required by conventional methods.

Still further in accordance with the present invention, there is provided a co-molding process for producing co-molded, chemical-bonded, canned refractory articles, the co-molding process comprising the steps of
(a) mixing a refractory aggregate with a chemical binder to form a pressable refractory composition;
(b) placing a metal can into a press cavity die
(c) charging said refractory composition into said metal can and press cavity die;
(d) subjecting said refractory composition to high pressures while in said press cavity die to shape and size said refractory article; and
(e) drying said refractory article at temperatures sufficient to cure said chemical binder.

Still further in accordance with the present invention, there is provided a co-molding process for producing co-molded, chemical-bonded, canned refractory nozzles.

Still further in accordance with the present invention, there is provided a co-molding process for producing co-molded, chemical-bonded, canned refractory slide gates plates.

These and other aspects of the present invention will be apparent to those skilled in the art upon reading and understanding of the specification that follows.

DETAILED DESCRIPTION OF THE PREFERRED EMBODIMENTS

Figure 1:
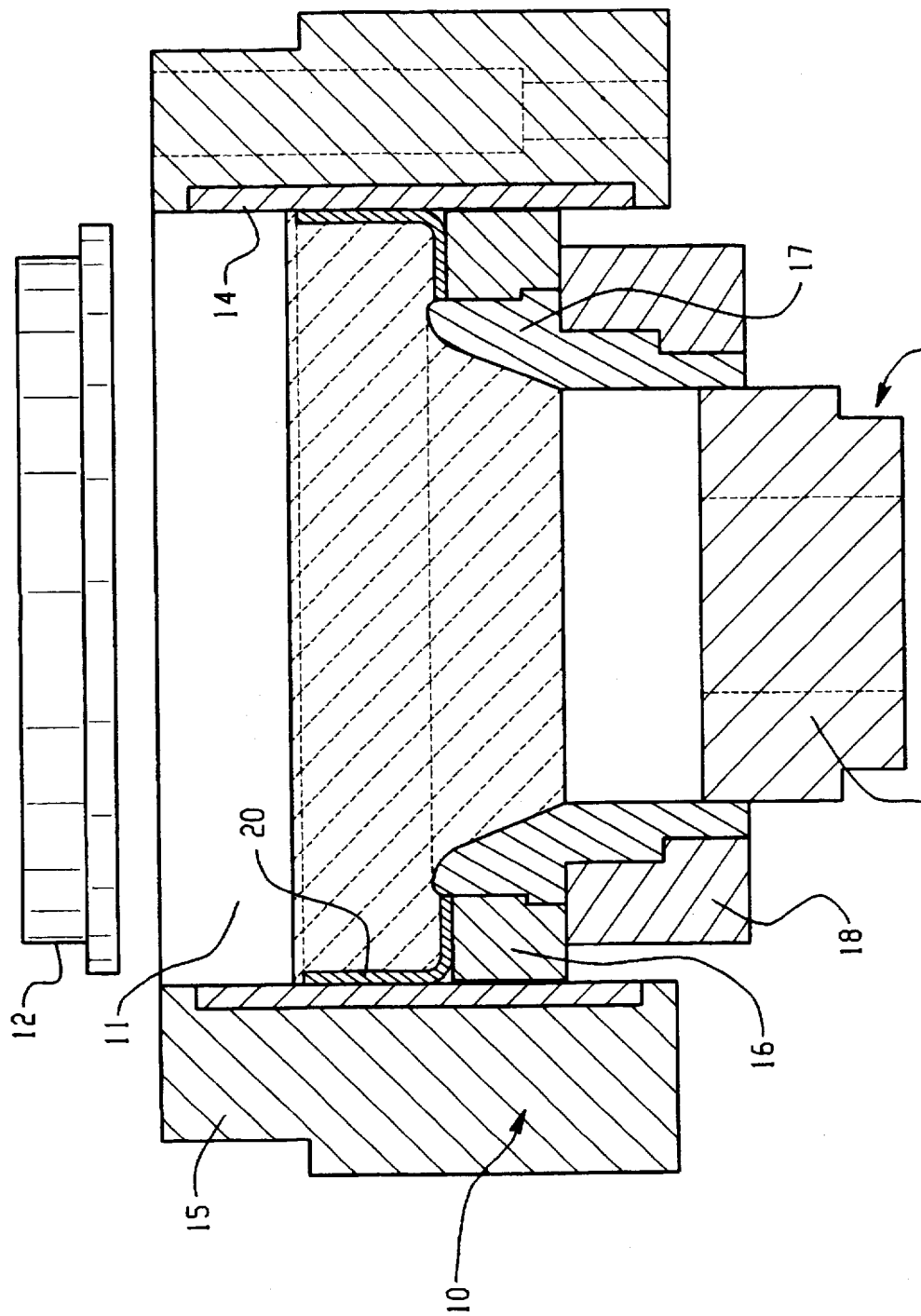
FIG. 1 is a cross-section of a press cavity die used in the co-molding process of the present invention.

The present invention is directed to a co-molding process for producing co-molded, chemical-bonded, canned refractory articles. The process of the present invention comprises mixing a refractory aggregate with a chemical binder to form a refractory composition, placing a metal can into a press cavity die, charging the refractory composition into the metal can and press cavity die, subjecting the refractory composition to high pressures while in the press cavity die to shape and size the refractory article, and drying the refractory article at temperatures sufficient to cure said chemical binder. The process of the present invention does not require the costly and problematic firing step as the use of chemical bond eliminates the need for high temperature firing. The process of the present invention further eliminates the separate canning and sizing steps of the conventional methods of the prior art as in the present invention the forming, canning, and sizing steps are all accomplished in one step.

The co-molded, chemical-bonded, canned refractory article of the present invention is prepared by first mixing a refractory aggregate with a chemical binder to form a pressable refractory composition. The refractory aggregate material may be in granular or powder form. The size of the refractory aggregate particulate is in the range of about a few microns to about a centimeter in diameter. In a preferred embodiment, the size of the refractory aggregate material particles is in the range from about −3 mesh to about −325 mesh. In one embodiment, the amount of refractory aggregate material in the refractory composition of the present invention is from about 85% to about 97% by weight. In another embodiment, the amount of refractory aggregate material is from about 90% to about 98% by weight.

The refractory aggregate may be comprised of aggregate materials known in this field. These aggregates may include, but are not limited to, alumina, mullite, alumina-silicates, silica, zirconia, alumina-zirconia, zirconia-mullite, magnesia, alumina-magnesia spinel, carbon, graphite, metal powders, antioxidants, and combinations thereof.

The refractory composition further comprises a chemical binder. The chemical binder used in the present invention can be any chemical binder known in the art for forming refractory materials. The chemical binder can be an inorganic material, an organic material, or combinations thereof. Inorganic materials which can be used as chemical binders are phosphates, silicates, sulfates, cements, alumina hydrates, and combinations thereof. Organic materials which can be used as chemical binders are resins, pitch, polyvinyl alcohols, and combinations thereof. The preferred organic materials used as chemical binders are resins. These resins include, but are not limited to, resole resins, novolac resins, liquid resins, powder resins, and combinations thereof.

The refractory composition may further comprise amounts of metallic aluminum, silicon, and magnesium metals, or a combination thereof. The refractory composition may also comprise components such as modifiers or fillers, so long as the modifiers and fillers do not appreciably change the characteristics of the nozzle.

The refractory composition is formed by mixing the refractory aggregate, the chemical binder and the other components by any means shown in the art. For example, the refractory aggregate and other components may be preblended for a specified time and then mixed for a time. The resin binder can then be added, and the composition further mixed for a specified time.

A metal can is placed into a press cavity die and the refractory composition is then charged into the metal can and press cavity die. While in the die, the refractory composition is subjected to high pressure to form, shape, and size of the refractory article. The pressure applied is preferably between about 3 T/in$^2$ (tons per square inch) to about 12 T/in$^2$.

Typical presses used in the process include but are not limited to hydraulic presses, friction or screw presses, toggle presses, and isostatic presses. The preferred press is a hydraulic press because pressure and size are easily controlled and production rates are high.

An example of a press cavity die 10 in the present invention is illustrated in FIG. 1. The press cavity die 10 is comprised of an opening 11 which is surrounded by top pad 12, bottom pad 13, liner 14, and liner holder 15. The liner 14 is located on the face of the liner holder 15 nearest the opening 11. The bottom pad 13 is comprised of several components. A facing pad 16 is located on the side of the bottom pad 13 nearest the liner 14. Adjacent the facing pad 16 is a pad sleeve 17, the pad sleeve 17 having one side which is in contact with the opening 11. Below the facing pad 15 and adjacent to the lower part of the pad sleeve is a back pad 18. A center pad 19 is located at the bottom of the bottom pad 13. A metal can 20 is inserted into the opening 11 adjacent to the liner 14 or adjacent to the liner 14 and on top of the bottom pad 13. The refractory composition is then charged into the opening 11 in the press cavity die and pressed to form, shape, and size the refractory article.

Forming the refractory articles in the press provides several advantages over the process for manufacturing canned refractory articles of the prior art. One advantage is that forming the article in the press provides higher pressures for better compaction of the refractory material. Another advantage is that forming in the press provides better size and shape control. A further advantage is that forming in the press requires less time than the ramming and casting processes.

Following the forming and shaping of the refractory article, the article is removed from the die to be dried. The article is dried at temperatures sufficient to cure the chemical binder but not fire or sinter the nozzle. Typically, the drying is carried out in a proper oven and at a temperature lower than that of firing. Preferably the refractory articles are dried at a temperature of about 200° F. to about 800° F.

Figure 2:
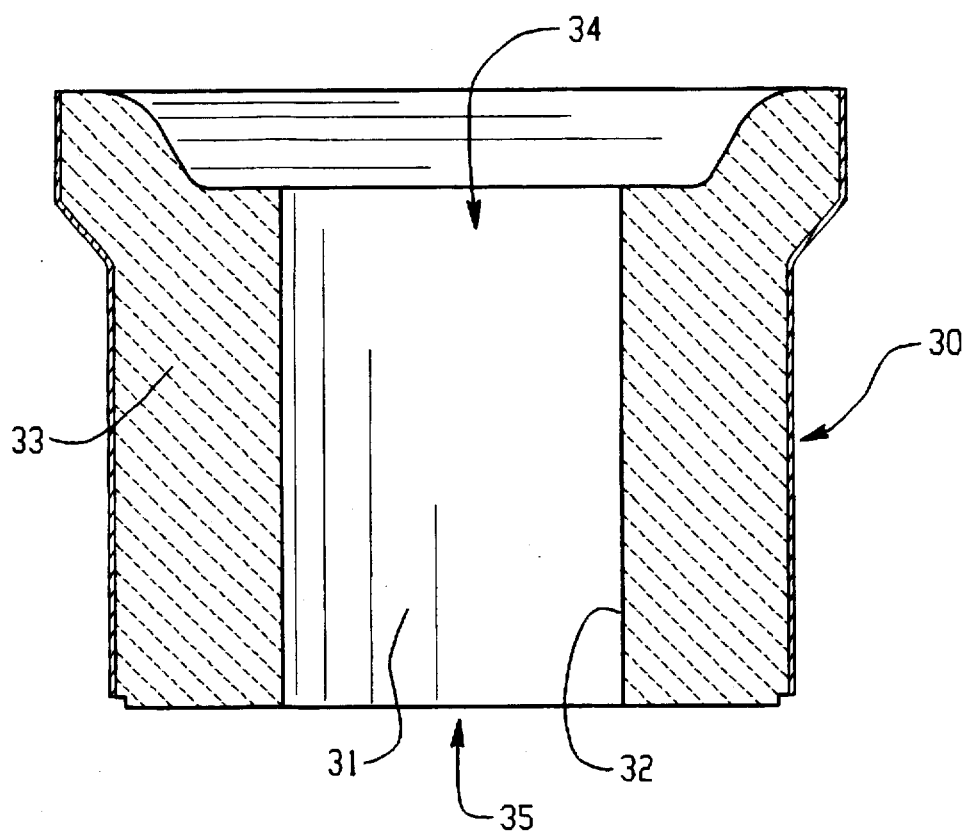
FIG. 2 is a cross-section of a nozzle manufactured according to the process of the present invention showing the various elements making up the nozzle.

In one embodiment, the co-molding process of the present invention produces co-molded, chemical-bonded, canned refractory nozzles as shown in FIG. 2. FIG. 2 shows a cross section and general structure of a nozzle 30. The nozzle has a hollow chamber 31 centrally located in the core of the nozzle and inner wall 32 forming the chamber 31 and an outer wall 33 forming the nozzle proper. The nozzle has an inlet 34 for receiving molten metal and an outlet 35 for discharging molten metal. The outer wall of the nozzle is surrounded by a metal can 36.

The nozzle is formed by mixing a refractory aggregate with a chemical binder to form a pressable refractory composition. The refractory aggregate contains about 50% to about 80% coarse aggregate and about 20% to about 50% fine aggregate. Preferably, the refractory aggregate contains about 61% coarse aggregate and about 39% fine aggregate. The chemical binder is preferably a resin. The amount of resin present in the composition is from about 3% by weight to about 15% by weight, preferably from about 6% by weight to about 8% by weight. A metal can is placed into a press cavity die and the refractory composition is charged into the metal can and press cavity die. The refractory composition is subjected to pressures from about 3 T/in$^2$ to about 7 T/in$^2$ to form the shape and size of the nozzle.

Preferably, the refractory composition is subjected to pressures from about 4 T/in² to about 5 T/in². Following the forming and shaping of the nozzle, the nozzle is dried at temperatures from about 300° F. to about 700° F., preferably from about 350° F. to about 450° F.

Figure 3:
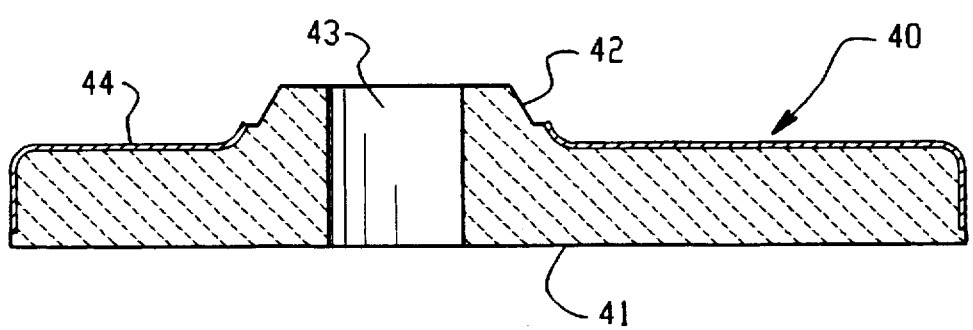
FIG. 3 is a cross-section of a slide gate plate manufactured according to the process of the present invention showing the various elements making up the slide gate plate.

In another embodiment, the co-molding process of the present invention produces co-molded, chemical-bonded, canned refractory slide gate plates as shown in FIG. 3. FIG. 3 shows a cross section and general structure of a slide gate plate 40. The slide gate plate 40 consists of a flat sliding surface 41 which mates with the flat surface of another plate, a boss 42 on the opposite surface to mate with a nozzle, and a bore 43. The plate is designed to fit into the slide gate. The upper plate is stationary, and the lower plate is moveable to fully or partially align the bores. Molten steel flow is controlled from full stream to complete shutoff by the degree of alignment or misalignment of the bores. The slide gate plate is encased in a metal can 44 except the sliding face surface and the boss.

The slide gate plate is formed by mixing a refractory aggregate with a chemical binder to form a pressable refractory composition. The refractory aggregate contains about 50% to about 80% coarse aggregate and about 20% to about 50% fine aggregate. Preferably, the refractory aggregate contains about 62% coarse aggregate and about 38% fine aggregate. The chemical binder is preferably a resin. The amount of resin present in the composition is from about 2% by weight to about 10% by weight, preferably from about 4% by weight to about 6% by weight. A metal can is placed into a press cavity die and the refractory composition is charged into the metal can and press cavity die. The refractory composition is subjected to pressures from about 5 T/in² to about 12 T/in² to form the shape and size of the plate. Preferably, the refractory composition is subjected to pressures from about 7 T/in² to about 10 T/in². Following the forming and shaping of the plate, the plate is dried at temperatures from about 300° F. to about 700° F., preferably from about 350° F. to about 550° F.

The co-molding process for producing co-molded, chemical-bonded, canned refractory articles of the present invention eliminates the firing or sintering steps required by the prior art processes for producing refractory shapes. The firing step requires large amounts of energy that in the process of the present invention can be supplied by the final working environment. In addition, the co-molded process of the present invention eliminates the separate forming, canning, and sizing steps of the processes of the prior art as in the process of the present invention, the forming, canning, and sizing steps are all accomplished in one step.

Other features and aspects of this invention will be appreciated by those skilled in the art upon reading and comprehending this disclosure. Such features aspects, and expected variations and modifications of the reported results and examples are clearly within the scope of the invention where the invention is limited solely by the scope of the following claims.

What we claim is:

1. A co-molding process for producing chemical-bonded, co-molded, canned refractory articles, wherein said co-molding process comprises:
    (a) mixing a refractory aggregate with a chemical binder to form a pressable refractory composition;
    (b) placing a metal can into a press cavity die;
    (c) charging said refractory composition into said metal can and press cavity die;
    (d) subjecting said refractory composition to pressures of about 3 T/in² to about 12 T/in² while in said press cavity die to shape and size said refractory article; and
    (e) drying said refractory article at temperatures sufficient to cure said chemical binder.

2. The co-molding process of claim 1 wherein said refractory aggregate is selected from the group consisting of alumina, mullite, alumina-silicates, silica, zirconia, alumina-zirconia, zirconia-mullite, magnesia, alumina-magnesia spinel, carbon, graphite, metal powders, antioxidants, and combinations thereof.

3. The co-molding process of claim 1 wherein said chemical binder is an inorganic material.

4. The co-molding process of claim 3 wherein said chemical binder is selected from the group consisting of phosphates, silicates, sulfates, cements, alumina hydrates, and combinations thereof.

5. The co-molding process of claim 1 wherein said chemical binder is an organic material.

6. The co-molding process of claim 5 wherein said chemical binder is selected from the group consisting of resins, pitch, polyvinyl alcohol, and combinations thereof.

7. The co-molding process of claim 6 wherein said chemical binder is a resin.

8. The co-molding process of claim 7 wherein said resin is selected from the group consisting of resole resins, novolac resins, liquid resins, powder resins, and combinations thereof.

9. The co-molding process of claim 1 wherein the refractory article is dried at a temperature in the range of about 200° F. to about 800° F.

10. A co-molding process for producing chemical-bonded, co-molding, canned refractory nozzles, wherein said co-molding process comprises:
    (a) mixing a refractory aggregate with a chemical binder to form a pressable refractory composition;
    (b) placing a metal can into a press cavity die;
    (c) charging said refractory composition into said metal can and press cavity die;
    (d) subjecting said refractory composition to pressures of about 3 T/in² to about 12 T/in² while in said press cavity die to shape and size said refractory nozzle; and
    (e) drying said refractory nozzle at temperatures sufficient to cure said chemical binder.

11. The co-molding process of claim 10 wherein said refractory aggregate contains about 50% to about 80% coarse aggregate and about 20% to about 50% fine aggregate.

12. The co-molding process of claim 11 wherein said refractory aggregate comprises about 61% coarse aggregate and about 39% fine aggregate.

13. The co-molding process of claim 10 wherein said chemical binder is a resin binder.

14. The co-molding process of claim 13 wherein the amount of resin binder in the refractory composition is from about 3% to about 15% by weight.

15. The co-molding process of claim 13 wherein the amount of resin binder in the refractory composition is from about 6% to about 8% by weight.

16. The co-molding process of claim 10 wherein the refractory composition is subjected to pressures of about 4 T/in² to about 5 T/in².

17. The co-molding process of claim 10 wherein the refractory article is dried at a temperature in the range of about 300° F. to about 700° F.

18. The co-molding process of claim 10 wherein the refractory article is dried at a temperature in the range of about 350° F. to about 450° F.

19. A co-molding process for producing chemical-bonded, co-molded, canned refractory slide gate plates, wherein said co-molding process comprises:

(a) mixing a refractory aggregate with a chemical binder to form a pressable refractory composition;

(b) placing a metal can into a press cavity die;

(c) charging said refractory composition into said metal can and press cavity die;

(d) subjecting said refractory composition to pressures of about 5 T/in$^2$ to about 12 T/in$^2$ while in said press cavity die to shape and size said refractory slide gate plate; and (e) drying said refractory slide gate plate at temperatures sufficient to cure said chemical binder.

20. The co-molding process of claim 19 wherein said refractory aggregate contains about 50% to about 80% coarse aggregate and about 20% to about 50% fine aggregate.

21. The co-molding process of claim 20 wherein said refractory aggregate comprises about 62% coarse aggregate and about 38% fine aggregate.

22. The co-molding process of claim 19 wherein said chemical binder is a resin binder.

23. The co-molding process of claim 22 wherein the amount of resin binder in the refractory composition is from about 2% to about 10% by weight.

24. The co-molding process of claim 22 wherein the amount of resin binder in the refractory composition is from about 4% to about 6% by weight.

25. The co-molding process of claim 19 wherein the refractory composition is subjected to pressures of about 7 T/in$^2$ to about 10 T/in$^2$.

26. The co-molding process of claim 19 wherein the refractory article is dried at a temperature in the range of about 300° F. to about 700° F.

27. The co-molding process of claim 19 wherein the refractory article is dried at a temperature in the range of about 350° F. to about 550° F.

* * * * *